(12) United States Patent
Jeong et al.

(10) Patent No.: US 6,195,552 B1
(45) Date of Patent: Feb. 27, 2001

(54) METHOD AND SYSTEM FOR CONTROLLING A PILOT MEASUREMENT REQUEST ORDER (PMRO)

(75) Inventors: Jin-soo Jeong; Pil-young Kim, both of Seoul (KR)

(73) Assignee: Samsung Electronics Co., LTD (KR)

( * ) Notice: Subject to any disclaimer, the term of this patent is extended or adjusted under 35 U.S.C. 154(b) by 0 days.

(21) Appl. No.: 09/317,349

(22) Filed: May 24, 1999

(30) Foreign Application Priority Data

May 25, 1998 (KR) .................................................. 98-18789

(51) Int. Cl.$^7$ ...................................................... H04L 12/66
(52) U.S. Cl. ........................... 455/436; 455/442; 455/437; 370/331
(58) Field of Search .................................... 455/422, 424, 455/425, 432, 436, 437, 438, 439, 442, 443; 370/320, 331, 335

(56) References Cited

U.S. PATENT DOCUMENTS

| | | | |
|---|---|---|---|
| 5,848,063 | * 12/1998 | Wearver, Jr. et al. | 370/331 |
| 5,946,621 | * 8/1999 | Chheda et al. | 455/440 |
| 5,987,013 | * 8/2000 | Kabasawa | 370/331 |
| 6,049,716 | * 4/2000 | Jung | 455/422 |
| 6,073,021 | * 6/2000 | Kumar et al. | 455/422 |
| 6,088,335 | * 7/2000 | I et al. | 370/252 |
| 6,112,089 | * 8/2000 | Satarasinghe | 455/437 |

* cited by examiner

Primary Examiner—Lee Nguyen
Assistant Examiner—Congvan Tran
(74) Attorney, Agent, or Firm—Dilworth & Barrese, LLP

(57) ABSTRACT

A method and a system are disclosed for controlling a pilot measurement request order for a soft swap handoff in a code division multiple access system. A preferred embodiment of the present invention comprises the steps of perceiving by a mobile station which is currently in communication with a first base transceiver station (BTS) a pilot signal strength which is above a predetermined threshold value, wherein the pilot signal is from a second BTS which is not currently in communication with the mobile station, reporting pilot signal strengths of the first BTS and of the second BTS through a pilot strength measurement message (PSMM) from the mobile station to a base station controller (BSC) if the mobile station perceives a pilot signal strength which is above a predetermined threshold value, informing the mobile station of reception of PSMM in order to prevent the mobile station from reporting unnecessary PSMM, checking whether the second BTS is corresponding to neighboring BTSs of the first BTS, ordering the mobile station to perform handoff, if the second BTS is corresponding to neighboring BTS, transmitting a pilot measurement request order (PMRO) from the BSC to the mobile station if the second BTS is not corresponding to neighboring BTS and reporting the strengths of all pilot signal receivable from BTSs through a pilot strength measurement message (PSMM) to the BSC after the mobile station waits for a predetermined action time upon reception of the PMRO.

32 Claims, 8 Drawing Sheets

METHOD AND SYSTEM FOR CONTROLLING A PILOT MEASUREMENT REQUEST ORDER (PMRO)

FIELD OF THE INVENTION

The present invention relates generally to cellular communications systems. More particularly, the present invention relates to a method and a system for controlling a pilot measurement request order (PMRO).

DESCRIPTION OF THE RELATED ART

As is well known in the art, a cellular mobile telecommunication system divides the entire service area into a plurality of base transceiver station (BTS) service areas which include smaller sized areas or cells. The cellular communication system controls each BTS using a switching system, thereby enabling users moving between cells to maintain communication with a BTS. In the cellular communication system, the handoff process allows a call to continue when a mobile station exits from a cell belonging to a servicing BTS into a cell of a neighboring BTS.

FIG. 1 shows a structure of a cellular system using a typical code division multiple access (CDMA) technique. As shown in FIG. 1, the cellular system comprises a plurality of mobile stations 400, 410, and 420, a plurality of base transceiver stations (BTSs) 310, 320, 330 and 340 for providing communication service to the mobile stations, a plurality of base station controllers (BSCs) 200 and 210 for controlling the BTSs and a mobile switching center (MSC) 100 for connecting the BSCs with a public switched telephone network (PSTN).

The MSC 100 obtains information about the mobile stations 400, 410 and 420 from a home location register (HLR) 110 and a visitor location register (VLR) 120 and provides a communication service.

A CDMA system provides various types of handoffs to allow a call to be maintained while a user moves from one service area to the next. For example, in a soft handoff, a mobile station is simultaneously connected with a plurality of base transceiver stations. A typical soft handoff method is disclosed in U.S. Pat. No. 5,640,414 entitled "Mobile Station Assisted Soft Handoff in a CDMA Cellular Communication System".

In accordance with a conventional soft handoff method, a BTS measures the level of a received signal of a mobile station in communication with the BTS and monitors whether the measured signal level drops below a predetermined threshold value. When the received signal level drops below the predetermined threshold value, the BTS judges that the mobile station is located at or near the boundary of a cell and informs a base station controller (BSC) of a mobile switching center (MSC) of this, thereby causing the BSC to check whether a neighboring BTS is receiving a stronger signal from the mobile station.

When the signal level that the neighboring BTS receives from the mobile station exceeds the predetermined threshold value, the BSC transfers a message for requesting handoff from the mobile station to the neighboring BTS and commands the mobile station to communicate with the neighboring BTS, so that handoff to the neighboring BTS is performed.

FIG. 2 illustrates a typical soft handoff procedure. As a mobile station moves from a region controlled by a base transceiver station (BTS) A into a region controlled by BTS B, a pilot signal strength (Ec/Io) of the BTS A gets weaker and a pilot signal strength of BTS B gets stronger.

As the received pilot signal strength of BTS B gets stronger, the predetermined threshold value, T_ADD will eventually be exceeded, and at that time, the mobile station reports the growth of the pilot signal strength of BTS B to a BSC through a pilot strength measurement message (PSMM).

The BSC confirms that BTS B is registered in the neighbor list of BTS A and commands a handoff to the mobile station. That is, the handoff is initiated by a command of the BSC. This is referred to as an "ADD". At that time, the mobile station is in simultaneous communication with both BTS A and BTS B.

As the mobile station moves closer to BTS B, the pilot signal strength of BTS A falls below a predetermined threshold value, T_DROP. When the pilot signal strength is continuously lower than the threshold T_DROP during a predetermined time period, T_TDROP, the mobile station requests a disconnection from BTS A. This is referred to as a "DROP". A handoff area is defined from the geographical point where the pilot signal of the BTS B exceeds the threshold T_ADD to the geographical point where the pilot signal of the BTS A is continuously lower than T_DROP during a time period T_TDROP.

In a center of the city where cell-overlap is high, when a fault occurs in a BTS serving a cell the BTS does not generate a pilot signal, a mobile station as a consequence receives a pilot signal of a neighboring BTS and informs a BSC of the newly received pilot signal strength. Consequently, the BSC does not command a handoff if the reported BTS is not registered in the neighbor list.

FIG. 3 illustrates an exemplary movement of a mobile station moving within a multiple cell-structure. Assuming, for example, that a fault occurs in BTS D which supports cell D 40. As a consequence of the fault, the mobile station which is currently being served by BTS A, does not receive the pilot signal from BTS D but instead receives a pilot signal from BTS B. However, since BTS B is not in the neighbor list of BTS A, the mobile station does not receive a handoff command from the BSC.

FIG. 4 illustrates a normal handoff operation in accordance with the prior art. As illustrated, because D cell operates normally, a mobile station 400 in an overlapped area of A cell 10 and D cell 40, simultaneously communicates with BTS A and BTS D.

FIG. 5 illustrates an abnormal handoff operation in accordance with the prior art. When D cell 40 has a fault, signal receiving areas of A cell 10 and B cell 20 increase and are overlapped. A mobile station 400 perceives a signal of B cell 20 in the overlapped area and requests a handoff to B cell 20. However, with reference to FIG. 3 the neighboring BTSs of the A cell are G cell 70, D cell 40, and C cell 30. Since the B cell is not registered in the neighbor list of BTS A, the BSC judges that the mobile station's request for handoff to B cell is mistaken.

FIG. 6 illustrates a method for controlling a pilot measurement request order (PMRO) of a handoff in accordance with the prior art. The handoff procedures will be described with reference to FIG. 6.

A BSC 200 already knows that BTSs G, D, and C are the neighboring BTSs of A cell. A mobile station 400 within A cell 10 perceives pilot signals of A cell and B cell for the case where the D cell is faulty. The mobile station sends a pilot strength measurement message (PSMM) including the pseudorandom noise (PN) codes of A cell and B cell to a BSC 200 via BTS A of A cell at step 1.

The BSC 200 sends a response to the PSMM (i.e., a BS_Ack_Order) to the mobile station 400, at step 2, and judges that the PSMM is bad since BTS B is not contained in the neighbor list of BTS A. The BSC 200 sends a pilot measurement request order (PMRO) to the mobile station 300 in order to request a PSMM again, at step 3. The mobile station 400 sends the same PSMM (which includes the Pilot signals of A cell and B cell) if the mobile station still perceives the signal of BTS B, at step 4. Then, the BSC 200 sends the same messages (BS_Ack_Order and PMRO) back to the mobile station in response to the second PSMM, at steps 5 and 6, and steps 4 to 6 are repeated until the mobile station 400 exits from the service area 20 of BTS B.

If the mobile station 400 exits from the service area 20 of BTS B and enters into a service area 30 of BTS C, the mobile station 400 sends a PSMM containing Pilot signals of A cell 10 and C cell 30 to the BSC, at step 7.

The BSC 200 transmits a response to the PSMM, at step 8. After confirming that the BTS C is contained in the neighbor list of the BTS A, the BSC 200 sends a handoff direction message (HDM) to the mobile station 400. The mobile station 400 performs handoff in response to the HDM and sends a handoff completion message (HCM) to the BSC 200.

As stated above, when a mobile station requests a handoff to a BTS that is not contained in the neighbor list (e.g., BTS B), unnecessary over the air (OTA) messages (i.e., PSMM, BS_Ack_Order, and PMRO) are serially generated between the mobile station and the BTS. Such messages redundantly perform handoff failure processes and result in unnecessarily increasing the load of the BTS and BSC.

Furthermore, if such handoff attempts occur while a mobile station is in communication with a BTS, and signaling packets in communication increase, it is likely that the traffic packets (i.e., voice packets) are not transmitted. The present invention provides a method for reducing the above unnecessary messaging that occurs when a mobile perceives a signal from a non-neighboring bas station.

SUMMARY OF THE INVENTION

The present invention is directed to a method for requiring a mobile station to measure a pilot signal only after a predetermined action time, following the mobile stations perception of a pilot signal of a new BTS which is not in the neighbor BTS list whenever the mobile station makes a handoff request to the newly perceived BTS. The instruction issued to the mobile station to wait for a predetermined action time is contained as part of a pilot measurement request order (PMRO) sent by the BSC.

Requiring the mobile station to wait for a predetermined time period before re-measuring a pilot signal provides the mobile station with a better opportunity to perceive only those pilot signals from a serving and neighboring BTS due to movement of the mobile station during the predetermined time period, in the situation where a mobile station requests handoff to a BTS which is not contained in the neighbor list. That is, it is contemplated that the mobile station will move sufficiently far away from the non-neighboring BTS in the time period so as to not perceive its pilot signal.

One embodiment of the present invention comprises the steps of: (1) perceiving by a mobile station, which is currently in communication with a first base transceiver station (BTS), a pilot signal strength, which is above a predetermined threshold value, from a second BTS which is not currently in communication with the mobile station; (2) reporting the pilot signal strength received from the first BTS and from the second BTS through a pilot strength measurement message (PSMM) from the mobile station to a base station controller; (3) sending an acknowledge signal to the mobile station in response to the PSMM; (4) checking whether the second BTS is a neighboring BTS of the first BTS; (5) ordering the mobile station to perform handoff if the second BTS is a neighboring BTS, (6) transmitting a pilot measurement request order (PMRO) including a predetermined action time from the BSC to the mobile station if the second BTS is not a neighboring BTS; and (7) reporting the strengths of the pilot signals received from each BTS through a pilot strength measurement message (PSMM) to the BSC after the mobile station waits for a predetermined action time included in the PMRO issued from the BSC.

According to a second aspect of the present invention, there is provided a method for controlling a pilot measurement request order (PMRO) comprising the steps of: (1) perceiving by a mobile station which is currently in communication with a first base transceiver station (BTS) a pilot signal strength which is above a predetermined threshold value, wherein the pilot signal is from a second BTS which is not currently in communication with the mobile station; (2) reporting pilot signal strengths of the first BTS and of the second BTS through a pilot strength measurement message (PSMM) from the mobile station to a base station controller (BSC); (3) if the mobile station perceives a pilot signal strength which is above a predetermined threshold value, informing the mobile station of reception of the PSMM in order to prevent the mobile station from reporting additional PSMM messages; (4) checking whether the second BTS is a neighboring BTS of the first BTS; (5) ordering the mobile station to perform handoff if the second BTS is a neighboring BTS; (6) transmitting a pilot measurement request order (PMRO) from the BSC to the mobile station if the second BTS is not a neighboring BTS after the BSC waits for a predetermined delay time; and (7) reporting the strengths of all pilot signal received from BTSs through a pilot strength measurement message (PSMM) to the BSC immediately upon reception of the PMRO.

According to a third aspect of the present invention, there is provided a method for controlling a pilot measurement request order (PMRO) comprising the steps of: (1) perceiving by a mobile station which is currently in communication with a first base transceiver station (BTS) a pilot signal strength which is above a predetermined threshold value, wherein the pilot signal is from a second BTS which is not currently in communication with the mobile station; (2) reporting pilot signal strengths of the first BTS and of the second BTS through a pilot strength measurement message (PSMM) from the mobile station to a base station controller (BSC) if the mobile station perceives a pilot signal strength which is above a predetermined threshold value; (3) informing the mobile station of reception of PSMM in order to prevent the mobile station from reporting unnecessary PSMM; (4) checking whether the second BTS is a neighboring BTS of the first BTS; (5) ordering the mobile station to perform handoff, if the second BTS is a neighboring BTS; (6) transmitting a pilot measurement request order (PMRO) from the BSC to the mobile station, after the BSC waits for a first predetermined delay time, if the second BTS is not a neighboring BTS; and (7) reporting, by the mobile station, the strengths of all pilot signal receivable from BTSs through a pilot strength measurement message (PSMM) to the BSC after the mobile station waits for a predetermined action time upon reception of the PMRO.

The present invention suppresses the unnecessary serial exchange of over the air (OTA) messages transmitted redundantly between a mobile station and a base station controller (BSC), when a mobile station perceives a pilot signal transmitted from a BTS where that BTS is not in the mobile's neighbor list due to a radio environment change and addition or removal of a BTS.

The removal of unnecessary over the air (OTA) messages transmitted redundantly between the mobile station and the BSC results in an improvement of communication quality, and reduction of failure in handoff processes results in a corresponding reduction of system load of BTS and BSC.

BRIEF DESCRIPTION OF THE INVENTION

DETAILED DESCRIPTION OF THE INVENTION

Figure 1:
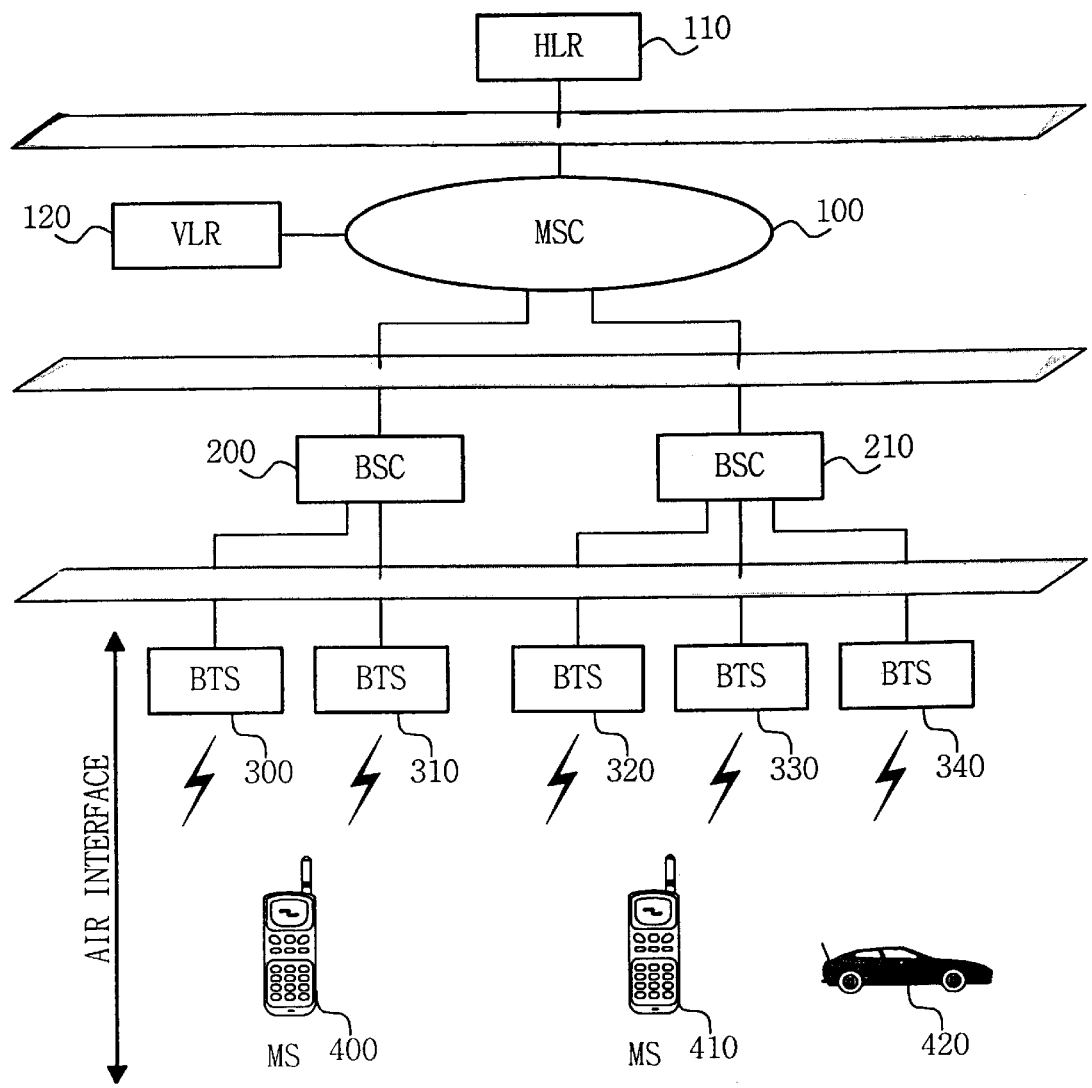
FIG. 1 is a simplified schematic block diagram of a code division multiple access (CDMA) cellular system in accordance with the prior art.
Figure 2:
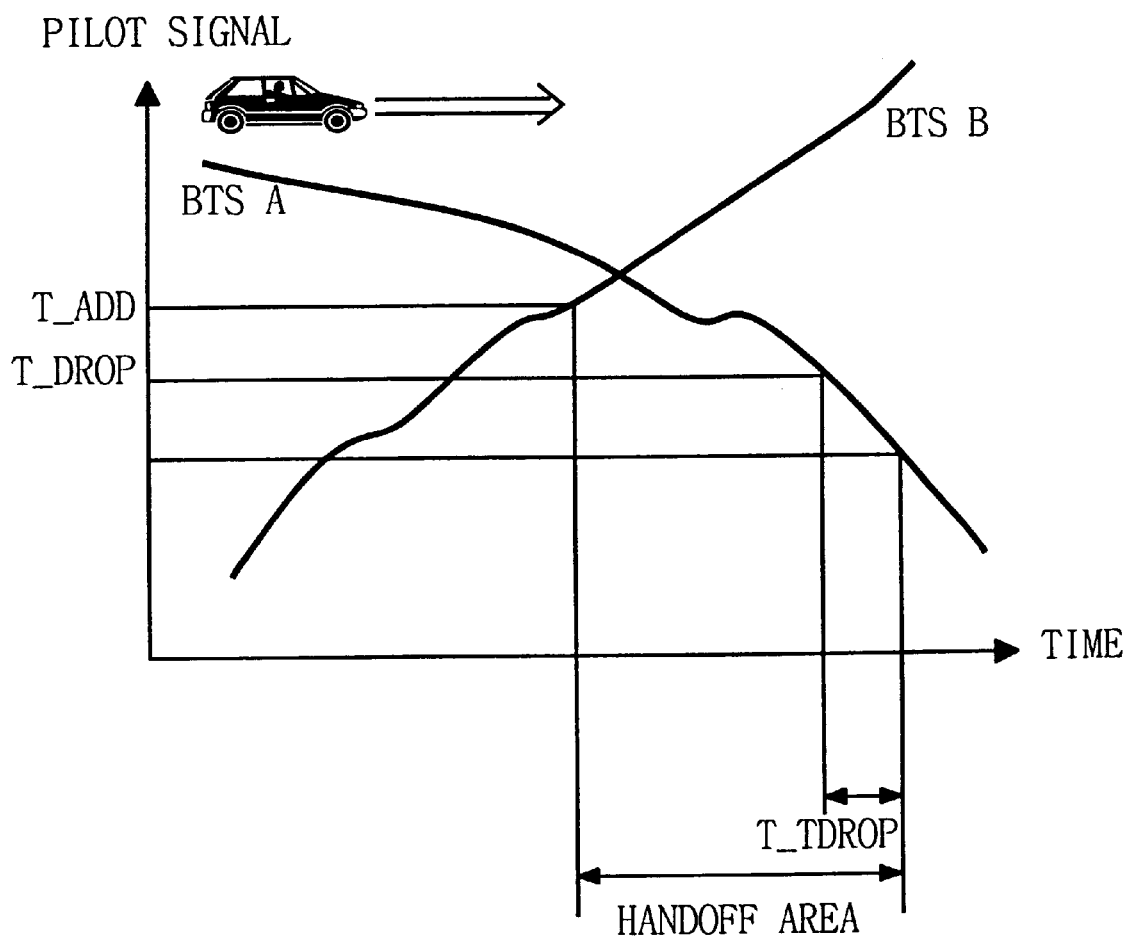
FIG. 2 is a graph demonstrating a typical soft handoff in accordance with the prior art.

Preferred embodiments of the present invention relate to a system and a method for instructing a mobile station to measure a pilot signal only after a predetermined time delay, in the case where the mobile station made a previous request for a handoff to a base transceiver station (BTS) which is not contained in the mobile station's neighbor list.

A first aspect of the present invention is directed to the establishment of the aforementioned predetermined time delay. The predetermined time delay value, referred to herein as an "action time", instructs the mobile station on how long to wait before making the pilot signal measurement. The time delay is included as part of the pilot measurement request order (PMRO) issued by a base station controller (BSC) subsequent to receiving a handoff request from a mobile station to a base station not contained in the mobile station's neighbor list. If the BSC switches an action time-use-field from "No" to "Yes" and transmits the PMRO to a mobile station, the mobile station will process the corresponding message only after waiting for the predetermined action time.

The predetermined action time is defined as a minimum time required for a mobile station to move away from a non-neighboring BTS to a position where a pilot signal strength from the non-neighboring BTS falls below a predetermined threshold value.

In addition to requiring the mobile station to wait for an action time before transmitting a PSMM message, a second aspect of the present invention is directed to a second predetermined time delay associated with the transmitting pilot measurement request order (PMRO) issued by a base station controller (BSC) to a mobile station. That is, the method further includes the mobile station receiving the PMRO from the BSC a predetermined delay time after the mobile station sends a pilot strength measurement message (PSMM).

A third embodiment of the present invention is directed to a method for combining the first two embodiments. That is, the BSC transmits a PMRO to a mobile station after a predetermined delay time and the mobile station handles the PMRO after a predetermined action time.

First Embodiment

The first embodiment will be described with reference to the attached drawings. The first embodiment is intended to improve an air interface standard such as IS-95, IS-95A, J-STD__008 and IS95B.

A pilot measurement request order (PMRO) is one of the forward traffic channel messages presented by the air interface standard. A BSC sets an action time USE-FIELD to "1" or "0" for determining whether or not to use an action time. In accordance with the first embodiment of the USE__TIME field contained within the PMRO message is set to "1" to set an action time. The action time may be defined as the amount of time the mobile station must wait before it can report the PSMM message.

When the BSC instructs a mobile station to transmit a PSMM soon after the mobile station receives the PMRO, the BSC sets the USE__TIME of the PMRO to "0" and sends the PMRO to the mobile station. Upon receiving a "0" value for USE__TIME of the PMRO from the BSC, the mobile station immediately reports a pilot strength measurement message (PSMM) back to the BSC. If, however, USE__TIME is set to "1", the mobile station reports a PSMM only after a pre-specified action time.

Figure 7:
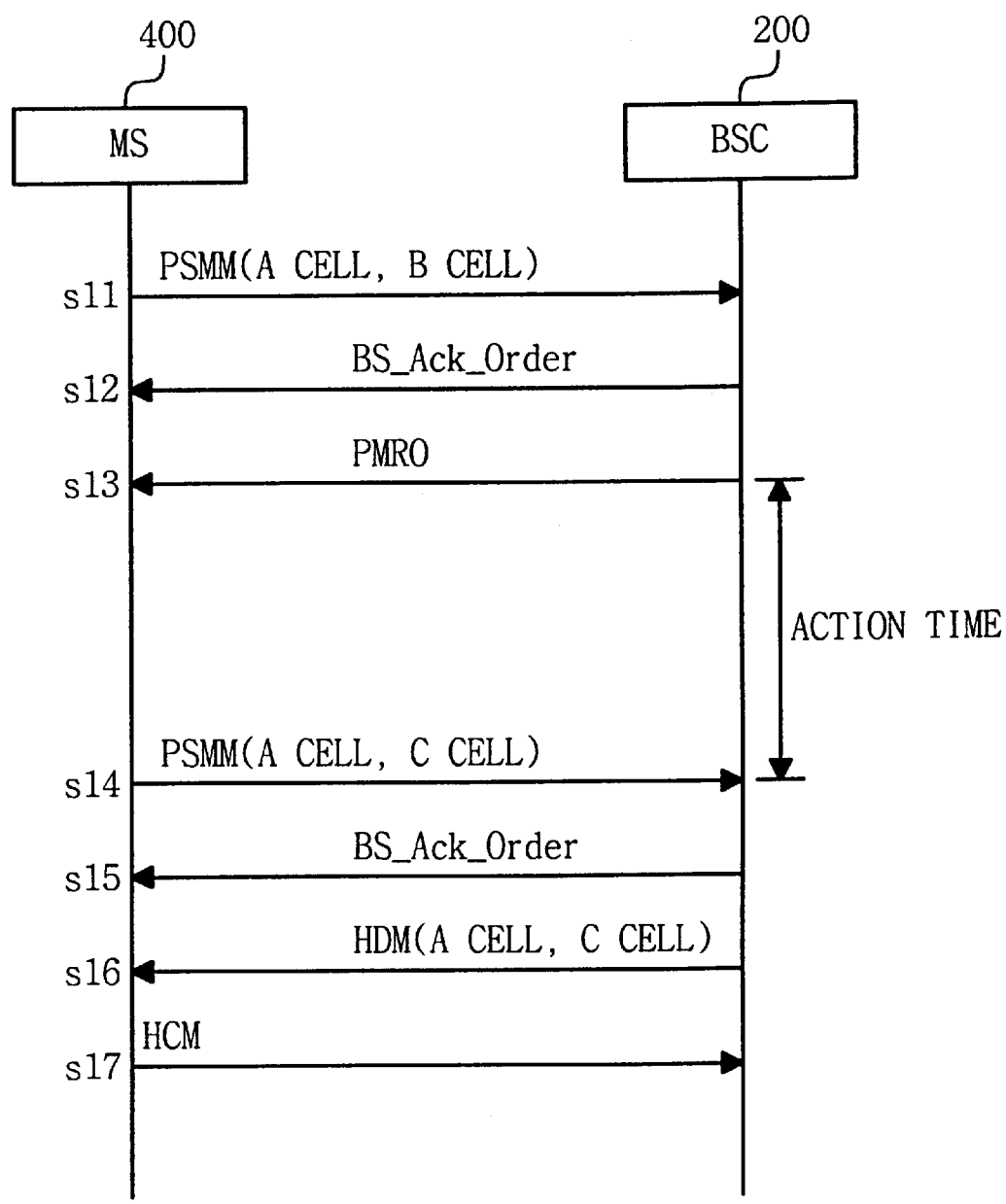
FIG. 7 is a messaging diagram for illustrating a method for controlling a pilot measurement request order (PMRO) of a handoff in accordance with an embodiment of the present invention.

FIG. 7 illustrates a method for controlling a pilot measurement request order (PMRO) of a handoff in accordance with the first embodiment of the present invention.

In FIG. 7, a mobile station 400 sends to a BSC 200 a pilot strength measurement message (PSMM) including pilot signal strengths of both an active BTS A and a BTS B which is newly perceived by the mobile station, at step 11. The BSC 200 responds by sending a BS__Ack__Order message in response to the PSMM to the mobile station 400 and commands the mobile station to no longer send the PSMM, at step 12.

The signals which are perceived by the mobile station are compared with T__ADD, a threshold value of a pilot signal which is defined as a level of pilot signal strength sufficient for the mobile station to perform communication. If the pilot signal of a BTS which is perceived by the mobile station is above T__ADD, the corresponding BTS should be active with (i.e., in communication with) by the mobile station.

The BSC 200 checks whether the BTS B is included in the neighbor list of the BTS A with reference to the received PSMM. That is, BTS B is identified through the PSMM. When the BTS B is not included in the neighbor list, the BSC sets the USE__TIME field of the PMRO to "1" and further adds information about an action time in the PMRO and sends the PMRO to the mobile station 400, requesting the mobile station 400 to again report pilot signal strength of the total BTSs which is currently being perceived by the mobile station 400 (step 13).

The mobile station 400 reports the PSMM after the action time if USE__TIME of the received PMRO is set to "1", at step 14. Since the mobile station continuously moves, it is possible for the mobile station to enter into a new BTS area during the action time. If the mobile station enters the area of a BTS C, for example, the PSMM will include Pilot signals of both BTS A and BTS C.

The BSC 200 transmits a BS_Ack_Order in response, at step 15, and checks whether the BTS C is included in the neighbor list of the BTS A with reference to the received PSMM. If the BTS C is included in the neighbor list, the BSC assigns a traffic channel of the BTS C and sends a handoff direction message (HDM) to the mobile station 400 in order to add the BTS C, at step 16. The mobile station 400 performs a handoff and informs the BSC 200 of completion of the handoff by sending a handoff completion message (HCM) to the BSC 200.

When the handoff is completed, the mobile station 400 has a channel with both BTS A and BTS C. The two BTSs, A and C, each receive a signal (voice frame) from the mobile station wherein they are transferred to the BSC 200. The BSC 200 selects one signal whose voice frame is better than the other among the signals received from BTS A and BTS C, respectively.

Because of movement of the mobile station 400, if a pilot signal of one of the two BTSs A and C, for example, BTS A drops below a threshold T_DROP continuously during a time T_TDROP, the BSC 200 requests that BTS A disconnect its channel with the mobile station 400. In this situation, the only remaining channel is between the mobile station 400 and the BTS C.

Figure 3:
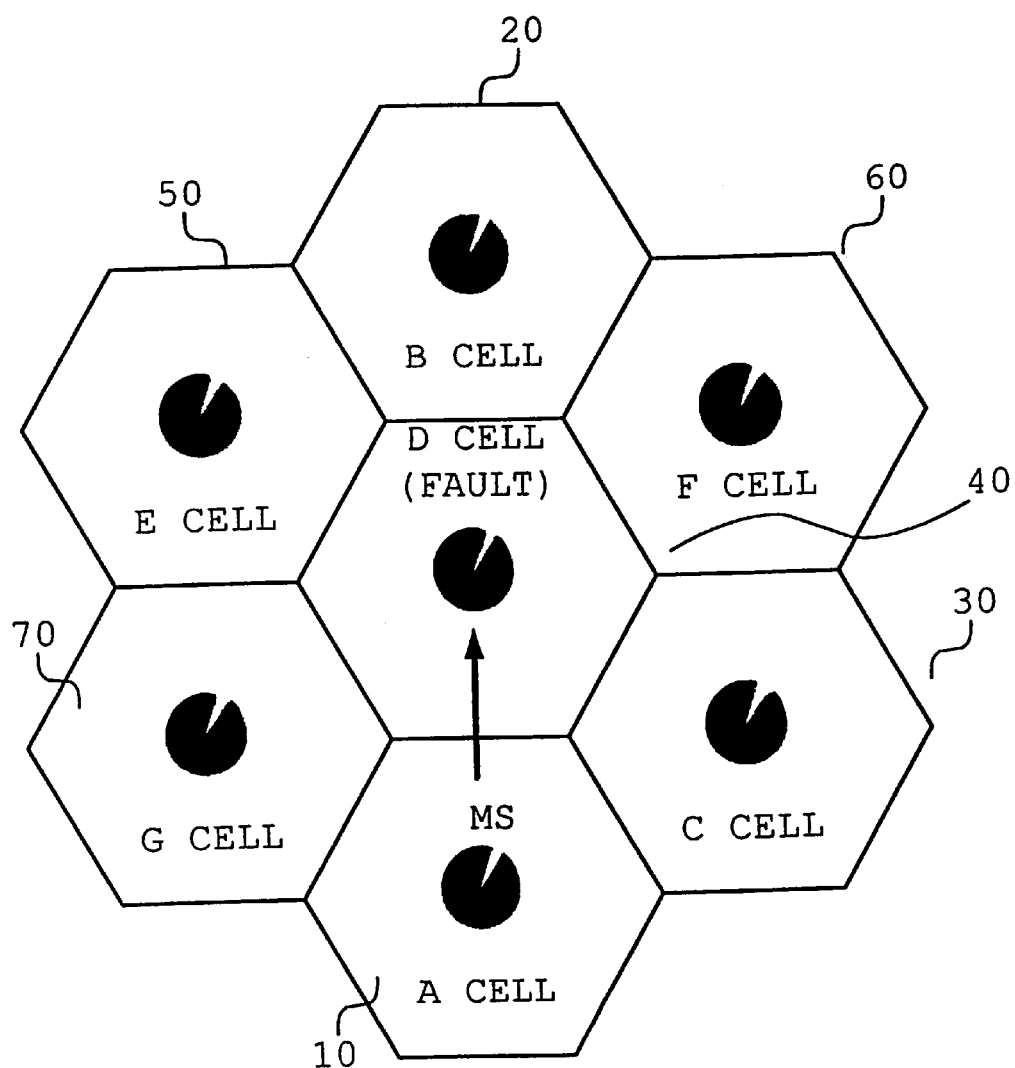
FIG. 3 is a diagram demonstrating the movement of a mobile station within multiple cells of the cellular system of FIG. 1.
Figure 4:
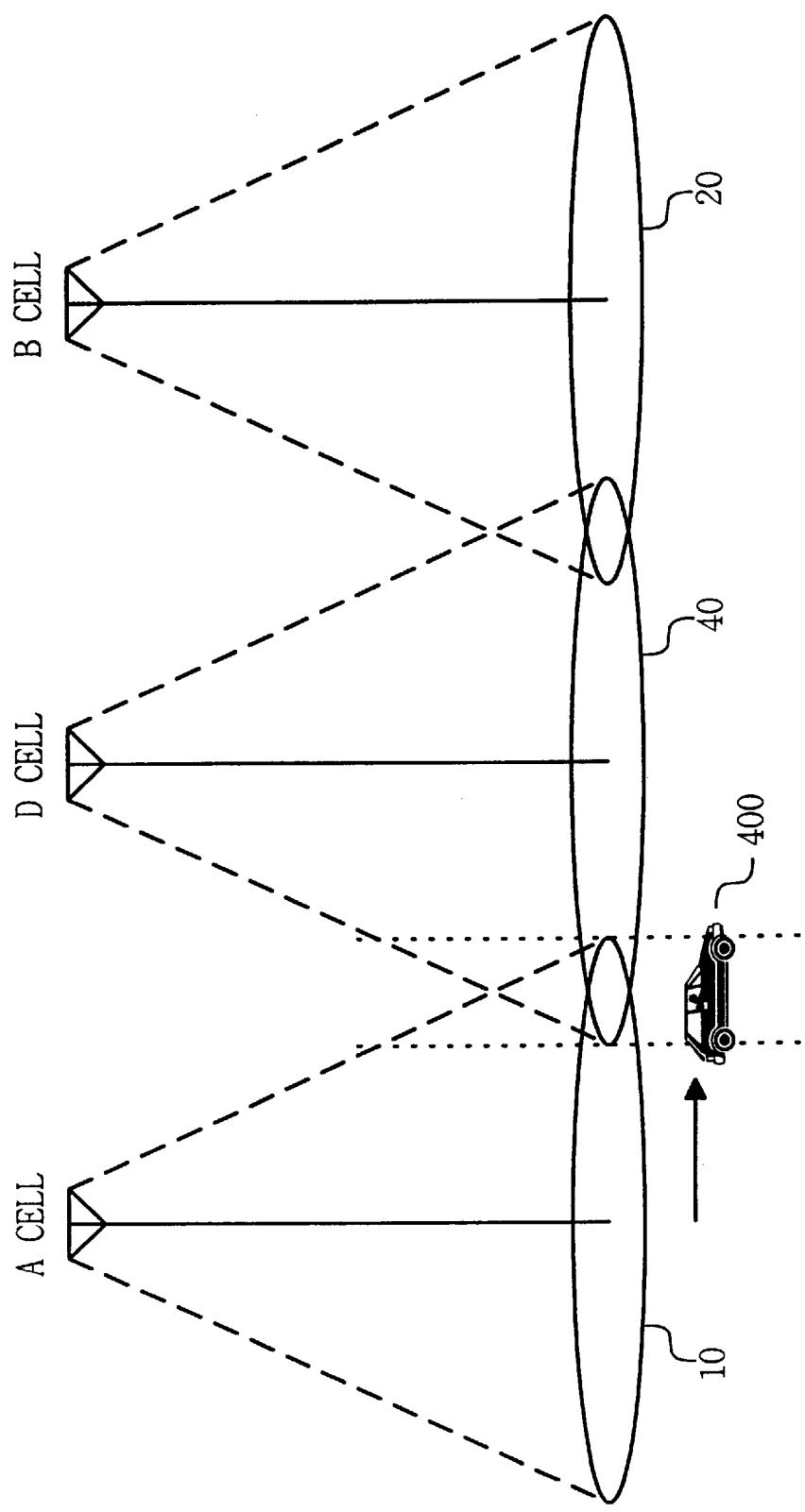
FIG. 4 is a diagram illustrating a normal handoff operation in accordance with the prior art.
Figure 5:
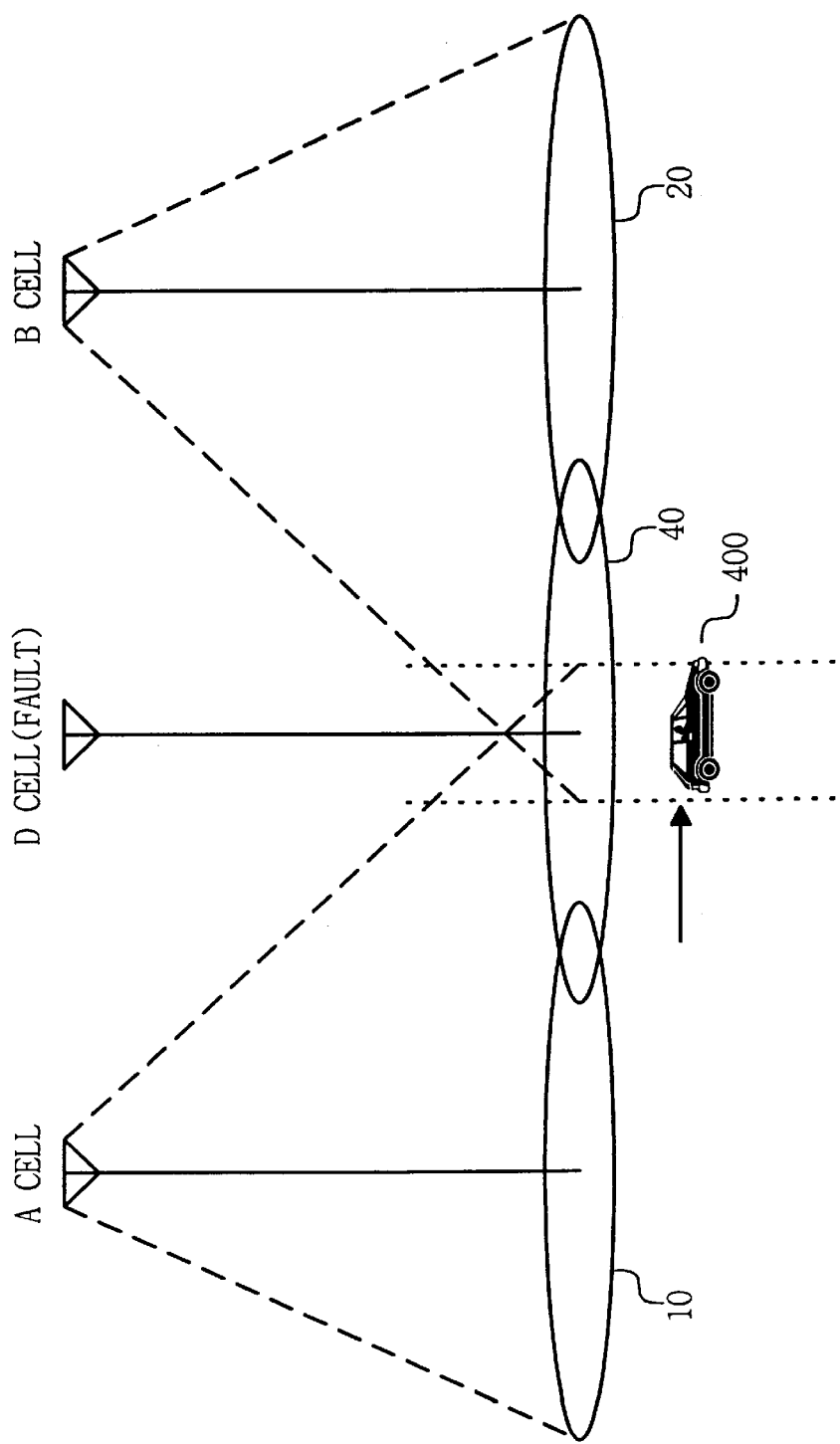
FIG. 5 is a diagram illustrating an abnormal handoff operation in accordance with the prior art.
Figure 6:
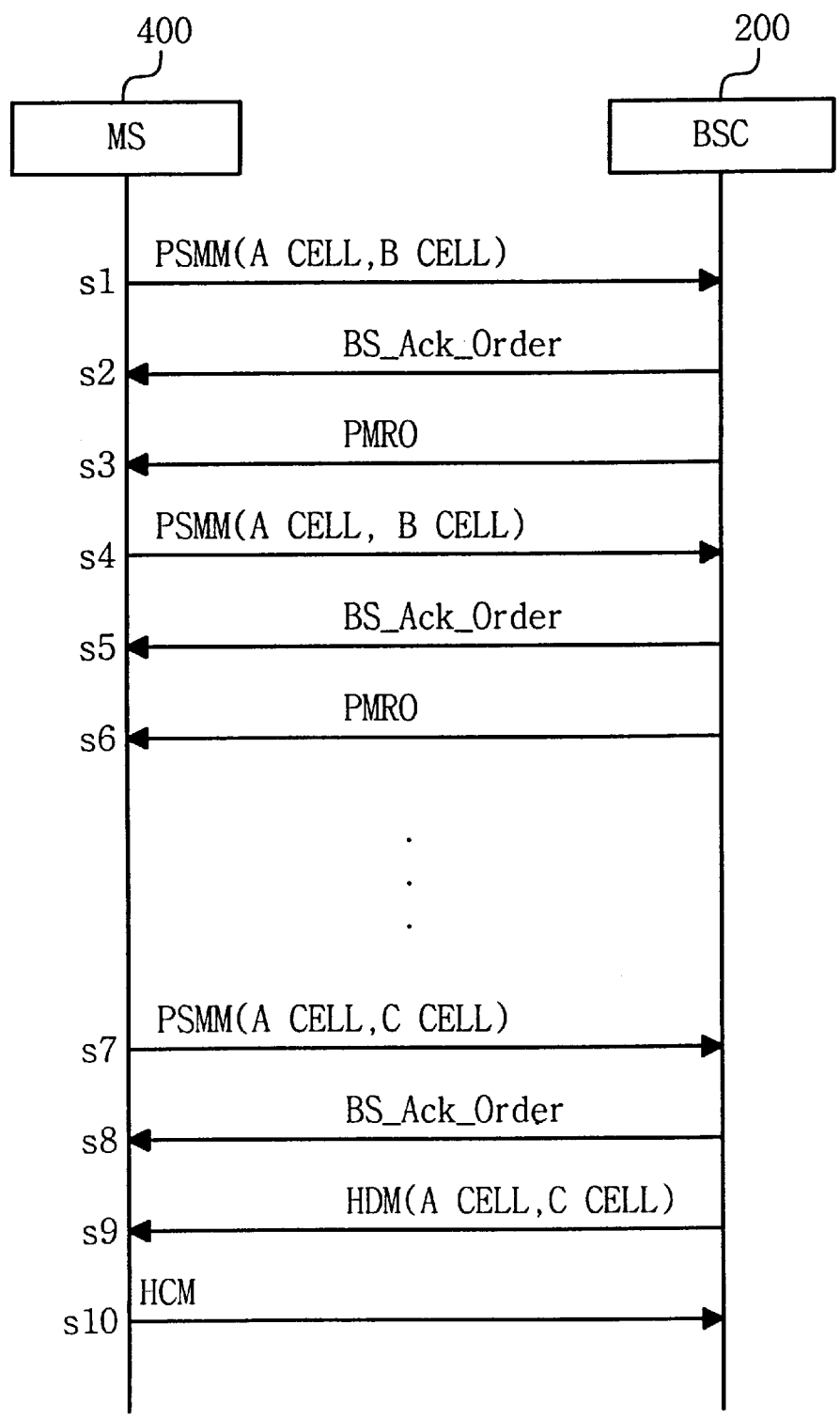
FIG. 6 is a messaging diagram for illustrating a method for controlling a pilot measurement request order (PMRO) of a handoff in accordance with the prior art.

The above procedures will be described in more detail with reference to FIG. 3. A communicating mobile station located in "A" cell 10 perceives pilot signals from neighboring BTSs and when a perceived pilot signal strength exceeds T_ADD, the mobile station transmits a pilot strength measurement message (PSMM) to a BSC. If D cell 40 should happen to be out of service, the mobile station would receive instead a pilot signal of "B" cell 20 instead of "D" cell 40. The BSC identifies the BTS B of the PSMM which is received from the mobile station and if the BTS B is not included in the list of neighboring BTSs, the BSC sets USE_TIME of a pilot measurement request order (PMRO) to "1" and transmits the PMRO including action time information to the mobile station.

Since the mobile station rarely remains around a boundary area between A cell 10 and D cell 40 as shown, the mobile station is more likely to perceive a pilot signal of other BTSs, not BTS B when the mobile station reports a pilot strength measurement message after the action time. Consequently, the steps of exchanging unnecessary PSMM and PMRO between the mobile station and the BSC never occurs.

Figure 8:
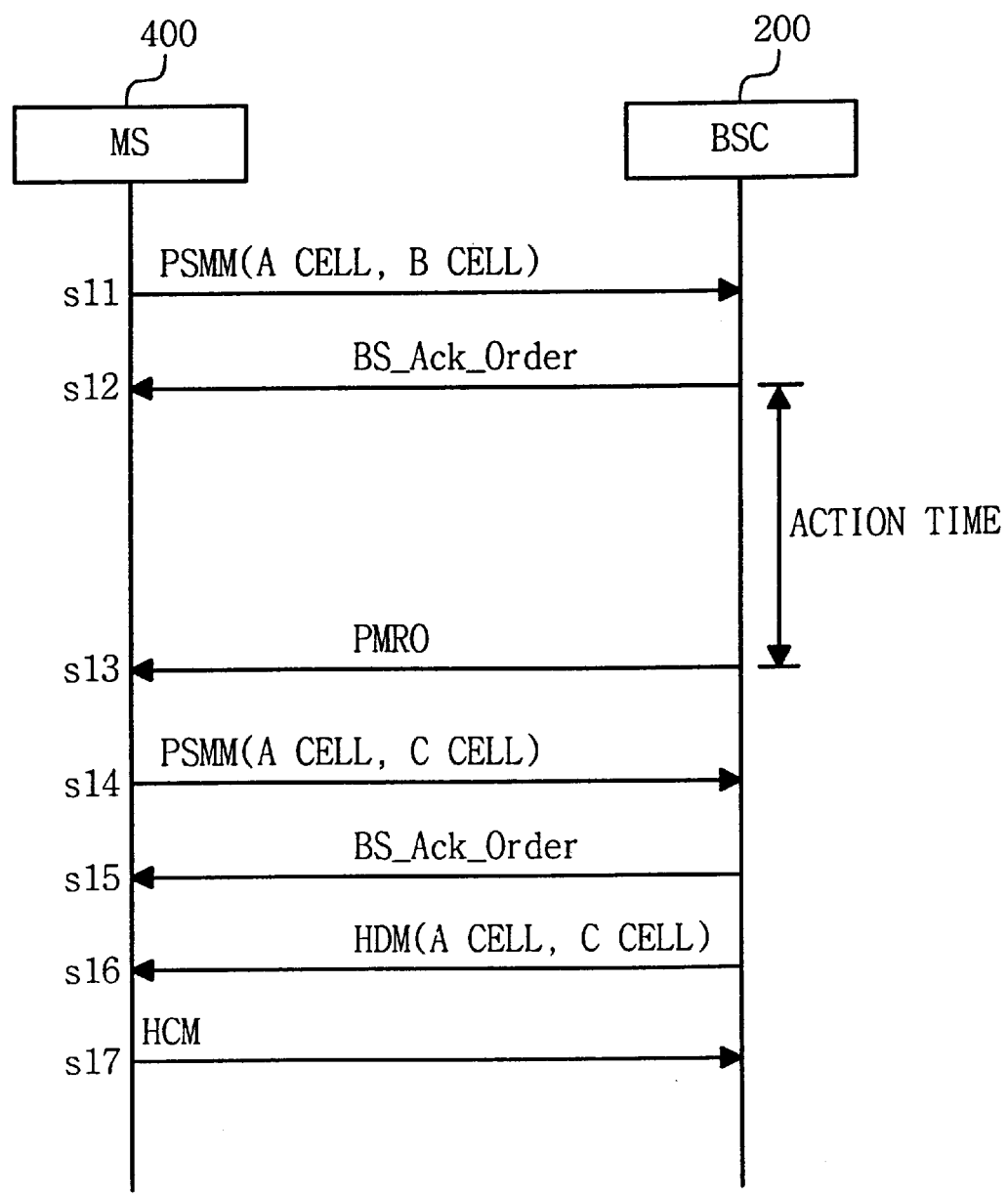
FIG. 8 is a messaging diagram for illustrating a method for controlling a pilot measurement request order (PMRO) of a handoff in accordance with the alternative of the present invention.

FIG. 8 illustrates a method for controlling a pilot measurement request order (PMRO) of a handoff in accordance with the second embodiment of the present invention. A BSC 200 sends a BS_Ack_Order message, a response to the PSMM of a mobile station 400 (step 12) and sends a pilot measurement request order (PMRO) to the mobile station after a predetermined delay time (step 13). In other words, the BSC 200 waits until the mobile station sufficiently moves and requests the PSMM.

The third embodiment of the present invention combines the first and second embodiments. That is, a BSC sends a PMRO to a mobile station after a predetermined delay time, and then USE_TIME of the PMRO is set to "1" and action time information is also included.

With respect to the third embodiment, since the mobile station transfers a PSMM after a total time including a transmission delay time by the BSC and an action time included in the PMRO, the BSC needs to calculate the delay time and action time.

While the invention is susceptible to various modification and alternative forms, specific embodiments thereof have been shown by way of example in the drawings and detected description. It should be understood, however, that the present invention is not limited to the particular forms disclosed, but on the contrary, the intention is to cover all modifications, equivalents, and alternative falling within the spirit and scope of the invention as defined by the appended claims.

What is claimed is:

1. Method for controlling a pilot measurement request order (PMRO) comprising the steps of:

perceiving by a mobile station which is currently in communication with a first base transceiver station (BTS) a pilot signal strength from a second BTS which is not currently in communication with said mobile station, when said pilot signal strength from said second BTS is above a predetermined threshold value;

reporting pilot signal strengths received from said first BTS and from said second BTS by said mobile station to a base station controller (BSC) through a pilot strength measurement message (PSMM) if said mobile station perceives a pilot signal strength from said second BTS which is above the predetermined threshold value;

informing the mobile station of the reception of the PSMM by said BSC to prevent said mobile station from reporting redundant PSMM messages to said BSC;

checking by the BSC whether said second BTS is a neighboring BTS of said first BTS;

ordering said mobile station by said BSC to perform handoff if said second BTS is a neighboring BTS;

transmitting a pilot measurement request order (PMRO) from said BSC to said mobile station if said second BTS is not a neighboring BTS; and reporting to said BSC the strength of all received pilot signals from BTSs through a pilot strength measurement message (PSMM) after said mobile station waits for a predetermined action time upon reception of said PMRO.

2. A method as set forth in claim 1, further comprising the steps of:

commanding said second BTS to assign a traffic channel if said second BTS is a neighboring BTS;

transferring a handoff direction message (HDM) from said BSC to said mobile station after said commanding step; and transferring a handoff completion message (HCM) from said mobile station to said BSC in response to said HDM after said mobile station establishes a traffic channel to said first and second BTSs.

3. A method as set forth in claim 2, further comprising a step of selecting and receiving the stronger signal between a signal received from said first BTS and a signal received from said second BTS after said transferring step.

4. A method as set forth in claim 1, wherein said transmitting step further includes setting an action time use field (USE-TIME) of said PMRO to "1" to cause the mobile station to wait for the (USE_TIME) prior to sending the PSMM and including said predetermined action time information in said PMRO.

5. A method as set forth in claim 1, wherein said predetermined action time is defined as a minimum time required for a mobile station to move to a position where a pilot signal strength above a predetermined threshold value is not received from said second BTS, wherein said second BTS is not a neighboring BTS of said first BTS.

6. A method as set forth in claim 5, wherein said predetermined threshold value equals a pilot signal level of strength sufficient for said mobile station to perform communication with said BTS.

7. A method for controlling a pilot measurement request order (PMRO) in a mobile communication system comprising the steps of:

perceiving by a mobile station, which is currently in communication with a first base transceiver station (BTS), a pilot signal strength above a predetermined threshold value, wherein said pilot signal is from a second BTS which is not currently in communication with said mobile station;

reporting pilot signal strengths of said first BTS and of said second BTS via a pilot strength measurement message (PSMM) by said mobile station to a base station controller (BSC), when said mobile station perceives a pilot signal strength from said second BTS which is above the predetermined threshold value from said second BTS;

informing said mobile station of the reception of said PSMM by said BSC to prevent said mobile station from reporting additional PSMM messages;

checking whether said second BTS is a neighboring BTS of said first BTS;

ordering said mobile station to perform handoff, if said second BTS is a neighboring BTS;

transmitting a pilot measurement request order (PMRO) from said BSC to said mobile station if said second BTS is not a neighboring BTS after said BSC waits for a predetermined delay time; and reporting the strengths of all pilot signal received from BTSs by the mobile station through a pilot strength measurement message (PSMM) to said BSC immediately upon reception of said PMRO.

8. A method as set forth in claim 7, further comprising the steps of:

commanding said second BTS to assign a traffic channel if said second BTS is a neighboring BTS;

transferring a handoff direction message (HDM) from said BSC to said mobile station after said commanding step; and transferring a handoff completion message (HCM) from said mobile station to said BSC in response to said HDM after said mobile station establishes a traffic channel to said first and second BTSs.

9. A method as set forth in claim 8, further comprising a step of selecting and receiving, the better signal from among a signal received from a first BTS and a signal received from a second BTS after said mobile station transfers said HCM to said BSC.

10. A method as set forth in claim 9, wherein said predetermined delay time is defined as a minimum time required for a mobile station to move to a position where a pilot signal strength above said predetermined threshold value is not received from said second BTS, wherein said second BTS is not a neighboring BTS of said first BTS.

11. A method as set forth in claim 10, wherein said predetermined threshold value is defined as a pilot signal level with strength sufficient for said mobile station to perform communication with said BTS.

12. A method for controlling a pilot measurement request order (PMRO) in a mobile communication system comprising the steps of:

perceiving by a mobile station which is currently in communication with a first base transceiver station (BTS) a pilot signal strength which is above a predetermined threshold value, wherein said pilot signal is from a second BTS which is not currently in communication with said mobile station;

reporting pilot signal strengths of said first BTS and said second BTS through a pilot strength measurement message (PSMM) from said mobile station to a base station controller (BSC) if said mobile station perceives a pilot signal strength from said second BTS which is above the predetermined threshold value;

informing the mobile station of a reception of the PSMM to prevent said mobile station from reporting additional PSMM messages;

checking whether said second BTS is a neighboring BTS of said first BTS;

ordering said mobile station to perform handoff, if said second BTS is a neighboring BTS;

transmitting a pilot measurement request order (PMRO) from said BSC to said mobile station, if said second BTS is not a neighboring BTS after said BSC waits for a predetermined delay time; and reporting the strengths of all pilot signal receivable from BTS through a pilot strength measurement message (PSMM) to said mobile station after said mobile station waits for a predetermined action time upon reception of said PMRO.

13. A method as set forth in claim 12, further comprising the steps of:

commanding said second BTS to assign a traffic channel if said second BTS is a neighboring BTS;

transferring a handoff direction message (HDM) from said BSC to said mobile station after said commanding step; and transferring a handoff completion message (HCM) from said mobile station to said BSC in response to said HDM after said mobile station connects a traffic channel to said first and second BTSs simultaneously.

14. A method as set forth in claim 13, further comprising a step of selecting and receiving, the better signal from among a signal received from said first and a signal received from a second BTS after said mobile station transfers said HCM to said BSC.

15. A method as set forth in claim 12, wherein in said step of transmitting said PMRO from said BSC to said mobile station, an action time-use-field (USE-TIME) of said PMRO is set to "1" and information indicating said action time is added in said PMRO.

16. A method as set forth in claim 15, wherein a combination time including said predetermined delay time and said predetermined action time is defined as a minimum time required for a mobile station to move to a position where a pilot signal strength above a predetermined threshold value is not received from said second BTS, wherein said second BTS is not a neighboring BTS of said first BTS.

17. A method as set forth in claim 16, wherein said predetermined threshold value is defined as level of pilot signal with a strength sufficient for said mobile station to perform communication.

18. A system for controlling a pilot measurement request order comprising:

means for perceiving a pilot signal strength which is above a predetermined threshold value, wherein said mobile station is currently in communication with a first base transceiver station (BTS) and said pilot signal is from a second BTS which is not currently in communication with said mobile station;

means for reporting a pilot signal strengths of said first BTS and of said second BTS through a pilot strength measurement message (PSMM) from said mobile station to a base station controller (BSC) if said mobile station perceives a pilot signal strength which is above a predetermined threshold value;

means for informing said mobile station of a reception of said PSMM in order to prevent said mobile station from reporting another PSMM;

means for checking whether said second BTS is a neighboring BTS of said first BTS;

means for ordering said mobile station to handoff if said second BTS is a neighboring BTS;

means for transmitting a pilot measurement request order (PMRO) to said mobile station if said second BTS is not a neighboring BTS; and means for reporting to said BSC the strengths of all pilot signals received from BTSs through a pilot strength measurement message (PSMM) after waiting for a predetermined action time upon reception of said PMRO.

19. A system as set forth in claim 18, further comprising:

means for commanding said second BTS to assign a traffic channel if said second BTS is a neighboring BTS;

means for transferring a handoff direction message (HDM) from said BSC to said mobile station after said commanding step; and means for transferring a handoff completion message (HCM) to said BSC in response to said HDM after said mobile station connects a traffic channel to said first and second BTS simultaneously.

20. A system as set forth in claim 19, further comprising means for selecting and receiving a better signal among signals received from said first and second BTS after said mobile station transfers said HCM to said BSC.

21. A system as set forth in claim 18, wherein said means for transmitting said PMRO to said mobile station sets an action time-use-field (USE-TIME) of said PMRO to "1" and adds information indicating said action time in said PMRO.

22. A system as set forth in claim 21, wherein said predetermined action time is defined as a minimum time required when a mobile station moves to a position where a pilot signal strength above a predetermined threshold value is not received from said second BTS, wherein said second BTS is not corresponding to neighboring BTSs of said first BTS.

23. A system as set forth in claim 22, wherein said predetermined threshold value is defined as level of pilot signal with the strength sufficient for said mobile station to perform communication.

24. System for controlling a pilot measurement request order comprising:

means for perceiving a pilot signal strength which is above a predetermined threshold value, wherein said mobile station is currently in communication with a first base transceiver station (BTS) and said pilot signal is from a second BTS which is not currently in communication with said mobile station;

a means for reporting pilot signal strengths of said first BTS and of said second BTS through a pilot strength measurement message (PSMM) from said mobile station to a base station controller (BSC) if said mobile station perceives a pilot signal strength which is above a predetermined threshold value;

means for informing said mobile station of reception of said PSMM in order to prevent said mobile station from reporting unnecessary another PSMM;

means for checking whether said second BTS is corresponding to neighboring BTSs of said first BTS;

a means for ordering said mobile station to handoff if said second BTS is corresponding to neighboring BTS;

means for transmitting a pilot measurement request order (PMRO) to said mobile station if said second BTS is not corresponding to neighboring BTSs after said BSC waits for a predetermined delay time; and means for reporting to said BSC the strengths of all pilot signals receivable from BTSs through a pilot strength measurement message (PSMM) immediately upon reception of said PMRO.

25. A system as set forth in claim 24, further comprising:

means for commanding said second BTS to assign a traffic channel if said second BTS is corresponding to neighboring BTS;

means for transferring a handoff direction message (HDM) from said BSC to said mobile station after said step of commanding; and means for transferring a handoff completion message (HCM) to said BSC in response to said HDM after said mobile station connects traffic channel to said first and second BTSs simultaneously.

26. A system as set forth in claim 25, further comprising a means for selecting and receiving, better signal among signals which are received from said first and second BTSs after said mobile station transfers said HCM to said BSC.

27. A system as set forth in claim 26, wherein said predetermined delay time is defined as a minimum time required when a mobile station moves to a position where a pilot signal strength above a predetermined threshold value is not received from said second BTS, wherein said second BTS is not corresponding to neighboring BTSs of said first BTS.

28. A system as set forth in claim 27, wherein said predetermined threshold value is defined as level of pilot signal with the strength sufficient for said mobile station to perform communication.

29. System for controlling a pilot measurement request order comprising:

means for perceiving a pilot signal strength which is above a predetermined threshold value, wherein said mobile station is currently in communication with a first base transceiver station (BTS) and said pilot signal is from a second BTS which is not currently in communication with said mobile station;

means for reporting pilot signal strengths of said first BTS and of said second BTS through a pilot strength measurement message (PSMM) from said mobile station to a base station controller (BSC) if said mobile station perceives a pilot signal strength which is above a predetermined threshold value; means for informing said mobile station of reception of said PSMM in order to prevent said mobile station from reporting another PSMM;

means for checking whether said second BTS is corresponding to neighboring BTSs of said first BTS;

means for ordering said mobile station to handoff if said second BTS is corresponding to neighboring BTS;

means for transmitting a pilot measurement request order (PMRO) to said mobile station if said second BTS is not corresponding to neighboring BTSs after said BSC waits for a predetermined delay time; and means for reporting to said BSC the strengths of all pilot signals receivable from BTSs through a pilot strength measurement message (PSMM) after said mobile station waits for a predetermined action time upon reception of said PMRO.

30. A system as set forth in claim 29, wherein said means for transmitting said PMRO to said mobile station sets an action time-use-field (USE-TIME) of said PMRO to "1" and adds information indicating said action time in said PMRO.

31. A system as set forth in claim 30, wherein a combined time including said predetermined delay time and said predetermined action time is defined as a minimum time required when a mobile station moves to a position where a pilot signal strength above a predetermined threshold value is not received from said second BTS, wherein said second BTS is not corresponding to neighboring BTSs of said first BTS.

32. A system as set forth in claim 31, wherein said predetermined threshold value is defined as level of pilot signal with the strength sufficient for said mobile station to perform communication.

\* \* \* \* \*